United States Patent [19]

Miklas

[11] 4,361,750

[45] Nov. 30, 1982

[54] DRIP COFFEEMAKER HAVING A CONDENSER ELIMINATING DELIVERY OF STEAM TO THE WATER SPREADER

[75] Inventor: Frank C. Miklas, Allentown, Pa.

[73] Assignee: General Electric Company, New York, N.Y.

[21] Appl. No.: 181,996

[22] Filed: Aug. 28, 1980

[51] Int. Cl.³ .................... A47J 31/057; A47J 31/54; F24H 1/12; F04B 19/24

[52] U.S. Cl. ...................................... 219/297; 99/288; 99/307; 219/283; 219/302; 219/314; 417/208

[58] Field of Search ............... 219/280, 283, 296–299, 219/301–309, 314; 417/207–209; 99/279–282, 288, 300, 302 R, 304–315

[56] References Cited

U.S. PATENT DOCUMENTS

| 832,045 | 10/1906 | Dowling | 219/296 X |
|---|---|---|---|
| 2,170,225 | 8/1939 | Unge | 417/209 X |
| 2,720,154 | 10/1955 | Graham | 417/208 X |
| 3,691,934 | 9/1972 | Horn et al. | 219/301 X |
| 4,070,956 | 1/1978 | Brown | 99/304 |
| 4,142,840 | 3/1979 | Kemp | 219/296 X |

FOREIGN PATENT DOCUMENTS

| 615375 | 7/1935 | Fed. Rep. of Germany | 219/307 |
|---|---|---|---|
| 2307762 | 12/1974 | Fed. Rep. of Germany | 219/296 |
| 1569204 | 6/1980 | United Kingdom | 219/297 |

Primary Examiner—A. Bartis
Attorney, Agent, or Firm—John F. Cullen; George R. Powers; Leonard J. Platt

[57] ABSTRACT

An electric thermostatically controlled drip coffeemaker has a generally upright C-shaped housing with a lower horizontal leg having a heated carafe support, an upper horizontal leg having a water spreader, and a vertical leg enclosing an accessible water reservoir. An electrically heated hot water generator in the lower leg has an inlet connected to the water reservoir and an outlet connected to the spreader by tubes through a separate definitive condenser located in the vertical leg entirely below the reservoir. The condenser includes an elongated generally cylindrical member larger in cross section than the connecting tubes and having an off-center radially directed water inlet from the hot water generator at the bottom thereof. Shaped and aligned baffle and flow directing means are disposed in the member to impart a non-swirling, vortex preventing, upward flow to the heated water. A captured, limited travel ball check valve disposed in an outlet at the top of the member permits vertical outflow only. The condenser provides a large condensing volume to eliminate steam delivery to the spreader while operating at lower average temperatures with surfaces almost continuously wetted and allowing high velocity fresh water flow to scrub or tear away accumulated scale deposits to reduce mineral deposition.

8 Claims, 4 Drawing Figures

DRIP COFFEEMAKER HAVING A CONDENSER ELIMINATING DELIVERY OF STEAM TO THE WATER SPREADER

BACKGROUND OF THE INVENTION

1. Field of the Invention

The invention relates to a brewing apparatus such as a drip coffeemaker and, more particularly, to an improved drip coffeemaker that interposes a separate definitive condenser or plenum chamber of a specific formation and construction in the tube between the heating source and the spreader for eliminating steaming and raising the brew temperature while delaying the build-up of mineral films in the system.

2. Description of Prior Art

In conventional electric drip coffeemakers it is common practice to provide a generally C-shaped molded plastic housing with a lower horizontal leg for holding a heated carafe, and the other upper horizontal leg forming an overhanging top wall above the carafe and containing a water spreader for dripping hot water through an intermediate coffee brew basket into the carafe. The vertical leg contains an internal water reservoir and heating chamber below it to supply heated water through tube means to a water spreader in the top wall of the housing and into the coffee brew basket. Such coffeemakers have widely replaced the percolator types and this general type, as shown in U.S. Pat. No. 3,968,740, may come in numerous sizes including smaller four cup coffeemakers of generally similar construction as shown in U.S. Pat. No. 4,142,840, both patents of common assignment. One of the problems associated with such coffeemakers is excessive steaming which leads to condensation leaks and long brew times and in some cases low brew temperatures. Additionally, objectionable mineral build-up in the system occurs as precipitated out of the water. The present invention is an improvement on such conventional drip coffeemakers to overcome these troubles. The concept of a definitive condenser in the line between the heater and the spreader is disclosed in co-pending co-owned application, Ser. No. 6/181,955, Filed Aug. 28, 1980 and the instant invention is an improvement on said co-pending application disclosing a specific structural arrangement of the definitive condenser to achieve the improved results.

SUMMARY OF THE INVENTION

In accordance with the invention, an electric brewing apparatus, specifically a drip coffeemaker having an upright C-shaped housing with one horizontal leg having a heated carafe support and the other leg containing a water spreader is provided. The vertical leg encloses an accessible water reservoir with an apertured bottom wall. A pump and heating chamber in the bottom of the housing delivers heated water by connected tube means through a separate definitive condenser to the spreader and then into a coffee basket and into the carafe as described in said Ser. No. 6/181,955 co-pending application. The present invention improves on this combination by providing a specific structural condenser of a generally cylindrically elongated member larger than the cross section of the connected tube means and having an off-center radially directed water inlet from the heating chamber into the member at the bottom thereof. Shaped and aligned baffle means and directing means are specifically disposed to impart a non-swirling, vortex preventing, upward flow to the incoming heated water. A reducing portion at the top forms a longitudinal vertical outlet to the tube means to the spreader. Within the member is a captured limited travel ball check valve at the outlet to permit vertical outflow only. It also provides a large condensing volume to eliminate steam to the spreader while operating at lower average temperatures with surfaces almost continuously wetted and allowing high velocity fresh water flow to scrub or tear away accumulated scale to reduce mineral deposits.

DESCRIPTION OF THE PREFERRED EMBODIMENT

Figure 1:
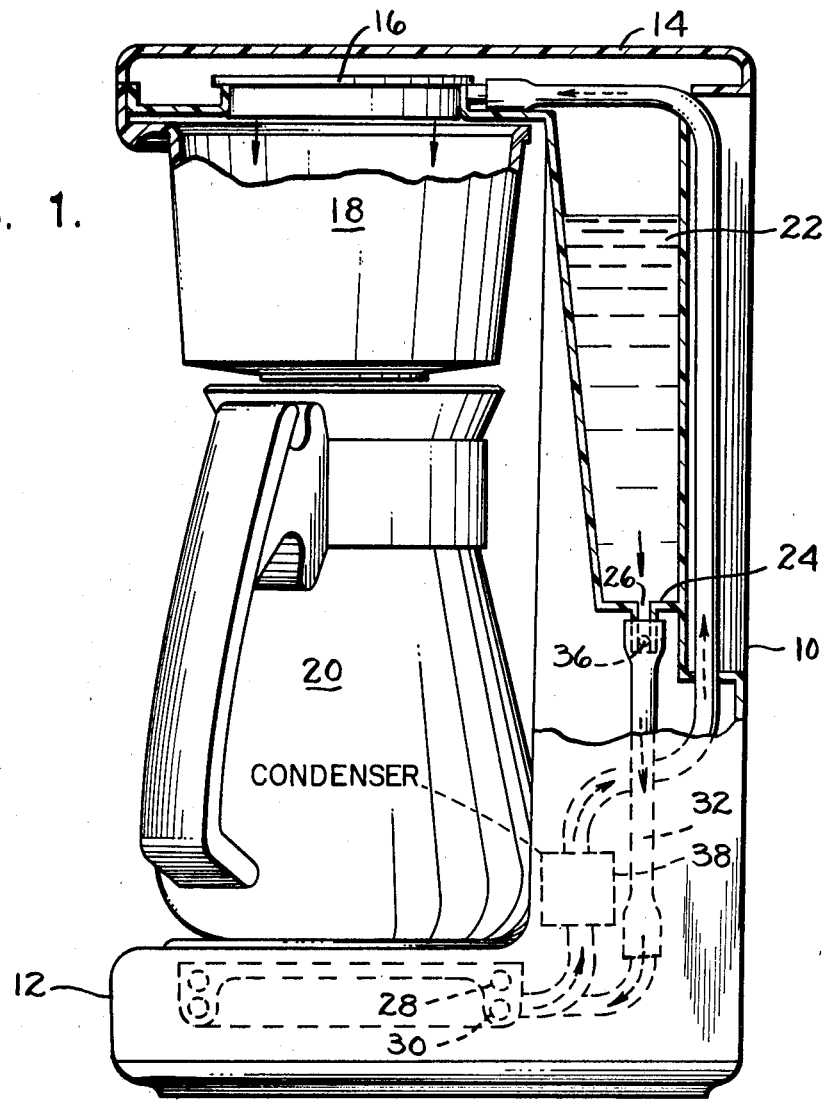
FIG. 1 is a front partially perspective view partly in section and phantom of a typical coffeemaker employing the invention.
Figure 2:
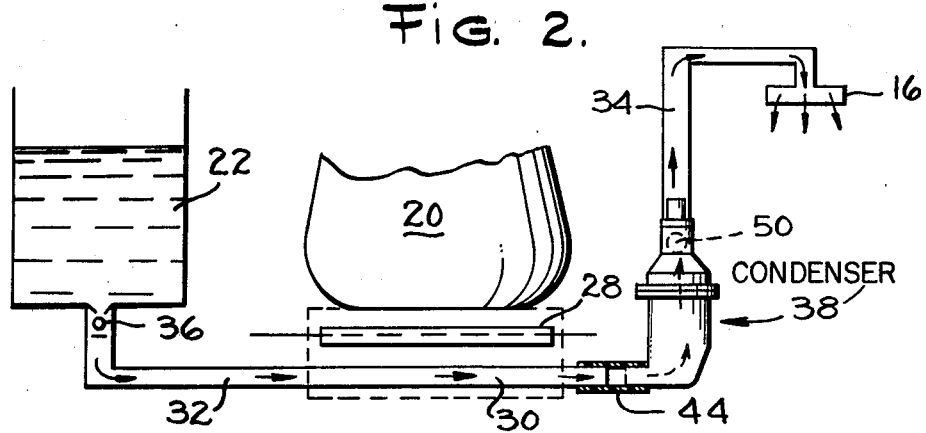
FIG. 2 is a schematic of the flow path showing the invention.

The description herein follows that of said co-pending application, up to the specific description of the structural condenser. As in said co-pending application, the invention may be used with any brewing apparatus which generally is a coffeemaker although not limited thereto. Referring to FIGS. 1 and 2 there is shown an electric drip coffeemaker which usually includes a molded plastic upright C-shaped housing having a horizontal leg 12 forming a support for receptacles such as a heated carafe with the upper horizontal leg 14 containing a water spreader 16 and extending over the lower leg so that a coffee basket 18 and carafe 20 are supported therebetween in conventional fashion. The third portion of the housing or vertical leg 10 encloses a water reservoir 22 in the upper portion thereof which reservoir is accessible by a removable lid at the top through which water may be poured into the reservoir to start the coffee making operation. To discharge contained water, reservoir 22 has a bottom wall 24 with a central aperture 26. Water is heated by a thermostatically controlled sheathed electric resistance heater 28 and preferably disposed in the lower horizontal leg portion in position above water tube 30 in a base casting. Parts 28, 30, and the base casting define a well known type of hot water generator for heating water and for maintaining an appropriate "keepswarm" temperature for brewed coffee in carafe 20. Water is directed from reservoir 22 through aperture 26 directly into the heating area of heater 28 of the hot water generator through tube means 32 into the water tube 30 where it is boiled to form a pump action in tube 30 and is delivered by separate conduit or connected tube means 34 to spreader 16 as hot water to drip into the coffee basket 18 and through to carafe 20 as brewed coffee.

The structure thus far described in conventional. Generally check valves, such as 36, may be supplied either at the reservoir outlet or the hot water generator outlet (not shown) or both to act as one-way valves. Such structure, with slight variations, is conventional in most current molded plastic drip coffeemakers.

Figure 3:
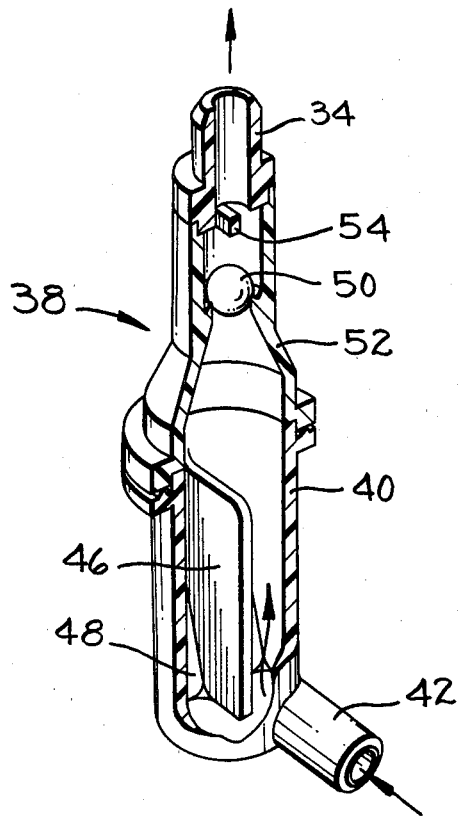
FIG. 3 is an enlarged perspective cross section of the specific elongated condenser member.
Figure 4:
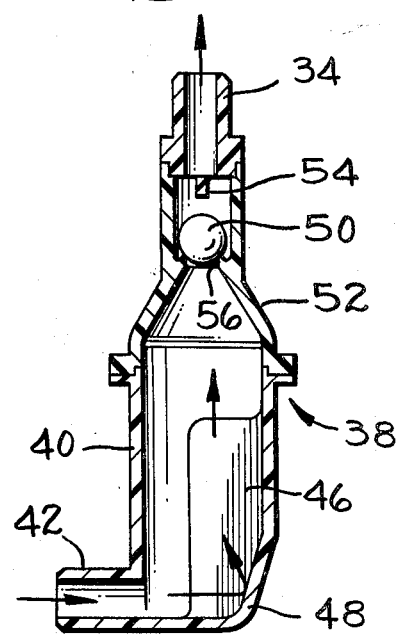
FIG. 4 is a cross sectional elevation of FIG. 3.

Generally, drip coffeemakers have excessive steaming which is carried from the hot water generator through the outlet tube and into the spreader. This excessive steaming leads to condensation leaks and long brew times and, in some cases, low temperatures. Locating a separate definitive condenser or plenum chamber 38 in the outlet line of the heater or hot water generator 28 as taught in said co-pending application eliminates steaming and vapor locks caused by a pressure stall that may occur in the tubing between reservoir 22 and spreader 16. The present invention is directed to a specific structural form of the condenser concept of said co-pending application to provide an improved structure which also delays the build-up of water mineral film in the system. To this end, the invention employs a specific condenser 38 larger in cross-section than the tube means 30 and 34 as seen in FIG. 2 and conveniently is disposed in the bottom portion of the brewing apparatus as seen in FIG. 1 in space available next to tube means 32 and below reservoir 22 in the base portion of vertical leg 10. The condenser is a direct contact condensation chamber comprising a generally cylindrical elongated member 40 considerably larger in cross-section than tube means 34 connecting it as seen in FIGS. 3 and 4. Steam that is generated in the hot water generator by water partially boiling or evaporating inside the hot water generator tube 30 creates a pressure that closes the inlet valve 36 and expels liquid followed by steam from the hot water generator. To fit in the brewing apparatus, a preferably off-center water inlet 42 is radially directed from the hot water generator into member 40 at the bottom thereof as seen in FIG. 3. Inlet 42 and water tube 30 are closely connected by a suitable sleeve 44 as seen in FIG. 2. In order to inhibit or kill any vortex action while permitting the delivery of pure hot water without steaming, a vertically aligned and shaped baffle 46 is disposed opposite to and offset from the inlet 42 and parallel thereto, the baffle extending substantially half the diameter or half-way radially into member 40 so that inlet water strikes the member 40 on one side of the aligned baffle. Cooperating with the baffle is a directing means 48 conveniently formed as a part of a slanted wall portion of member 40 opposite the inlet so that inlet water is directed onto one side of the baffle and then at a right angle upwardly by the slanted wall 48 to flow along the one side of baffle 46 in a non-swirling upward flow or vortex-inhibiting manner.

In order to insure one-way flow outwardly from the condenser, a captured limited travel ball check valve 50 is disposed at the end of a reducing portion 52 at the top of the elongated member 40 and the ball check valve can be integrated as part of the overall condenser 38 as shown in FIGS. 3 and 4. Preferably, the ball check valve is a stainless steel ball for weight and its travel is limited by a rib stop means 54 in the upward direction and the downward flow check function is performed by the usual valve seat 56 so that water is permitted to freely flow only vertically with limited movement of the valve 50. Thus the vertical movement of the ball 50 is limited but not the water flow. In the preferred arrangement of the condenser, the inlet at 42 and outlet connecting with tube means 34 are substantially equal in cross-section as shown in FIG. 4 and the entire condenser 38 is disposed below reservoir 22 as shown in FIG. 1.

The mode of operation is that water is pumped out of the hot water generator tube 30 when the steam bubbles, which form due to heating by heater 28, to cause a pressure increase which closes inlet valve 36 forcing the expulsion of a bubbly slug of water outwardly through the condenser 38, the outlet ball check valve 50, and outlet tube 34 to spreader 16. Much of the pumped water is at sub-boiling temperatures. Steam mixes with the sub-boiling temperature water and condenses in the substantially large condenser 38 creating a pressure drop. Then outlet check valve 50 closes and the pressure imbalance is satisfied by the high velocity inlet suction of water from reservoir 22 into tube 30. This suction pulse is partially offset by the continuing steam generation within the water tube 30, but the magnitude of the pressure drop due to steam bubble condensation will generally overpower the positive pressurization due to continuing steam generation within the water tube 30. If conditions attain which make the condenser action marginal, the casting 31 overheats causing the coffeemaker thermostat to open the circuit. The continuing steam generation due to stored heat in the casting soon drops low enough to allow full priming of the system. In this condition, the inducted water rushes through the water tube 30 filling the condenser 38. This reestablishes a thermal condition capable of steam bubble condensation within the condenser until such time that the water in the condenser heats to near boiling again allowing the steam to blow through. The cycle proceeds to open the thermostat reestablishing non-steaming pumping. It is necessary to cycle the thermostat when the heat input to the water is impaired by the build-up of mineral deposits or thermally insulative films which also create increased friction effects. The present system of the specific condenser configuration delays the build-up of mineral deposits by reducing the rate of mineral build-up because the system operates at lower average temperatures with surfaces almost continuously wetted. Also, the high velocity induction of fresh water causes a stripping or scrubbing action - frequent tearing away of the accumulated scale or mineral deposits due to thermal shock and mechanical scrubbing action. This increases the overall life of the coffeemaker.

Thus, a conventional coffeemaker with a discrete or definitive condenser, is disclosed in said co-pending application, Ser. No. 6/181,955 Filed: Aug. 28, 1980. The preferred definitive condenser combination herein is of a specific design to provide elimination of steaming and has the needed exit valve integrally located adjacent to and as part of the condenser. The offset inlet 42 to the condenser creates an undesirable internal vortex action which allows a funnel permitting steam to pass up the center. This is overcome by baffle 46 and directing means 48 which inhibits or kills the vortex action resulting from the right angle flow into and out of the condenser. Finally, the specific condenser design here lends itself well to few and integral parts easily manufactured and fitted together by ultrasonic welding to eliminate leakage while lending itself to the use of suitable plastic parts, and the use of an overall integrated ball check vortex-killing condenser with right angle flow as part of a drip coffeemaker combination.

While I have herein before described a preferred form of the invention, obvious equivalent variations are possible in light of the above teachings. It is therefore to be understood that, within the scope of the appended claims, the invention may be practiced otherwise as specifically described, and the claims are intended to cover such equivalent variations.

I claim:

1. In an electric thermostat-controlled drip brewing apparatus having an upright generally C-shaped housing, with a lower horizontal leg having a heated carafe support and an upper leg having a water spreader, the vertical leg enclosing an accessible water reservoir with an apertured bottom wall and a pump and heating chamber in the housing bottom for delivering heated water by connected tube means through a separate definitive condenser to the spreader, an improvement in said condenser comprising,

- a generally cylindrical elongated condenser member larger in cross section than said connected tube means,
- a radially directed water inlet from the heating chamber into said member at the bottom thereof,
- means in said member imparting a non-swirling upward flow to incoming heated water,
- a reducing portion at the top of said member forming a longitudinal vertical outlet connection to said tube means to the spreader,
- a captured limited travel ball check valve at said outlet connection disposed for vertical outlet flow only,
- whereby the right angle non-swirling flow through said member from the heating chamber provides a large condensing volume to eliminate steam to said spreader.

2. Apparatus as described in claim 1 wherein said means in the member is a vertical baffle disposed to inhibit any vortex action by said incoming water.

3. Apparatus as described in claim 2 wherein said baffle extends radially into said cylindrical member substantially half the diameter thereof parallel to the centerline of said offset so inlet water strikes the member on one side of the baffle.

4. Apparatus as described in claim 3 having said inlet offset and directing means opposite said offset inlet to direct inlet water upwards in said member.

5. Apparatus as described in claim 4 wherein said directing means is a slanted wall portion of said member.

6. Apparatus as described in claim 5 wherein said ball check is a stainless ball with rib stop means limiting vertical ball travel but not water flow.

7. Apparatus as described in claim 6 wherein the inlet to and outlet from the cylindrical elongated member are substantially equal in cross section.

8. Apparatus as described in claim 7 wherein said cylindrical elongated member is disposed below said reservoir in the vertical leg of the C-shaped housing.

* * * * *